United States Patent [19]

Eckhoff

[11] 4,108,811
[45] Aug. 22, 1978

[54] COMPOSITION PROCESS FOR AQUEOUS BASE COATINGS FOR CORRODIBLE METALS

[75] Inventor: Paul Sheppard Eckhoff, Melville, N.Y.

[73] Assignee: International Minerals & Chemical Corp., Libertyville, Ill.

[21] Appl. No.: 747,015

[22] Filed: Dec. 2, 1976

Related U.S. Application Data

[63] Continuation-in-part of Ser. No. 382,040, Jul. 23, 1973, Pat. No. 3,919,145, and Ser. No. 615,067, Sep. 19, 1975, abandoned.

[51] Int. Cl.$^2$ .......................... C09D 3/66; C09D 3/72
[52] U.S. Cl. .......................... 260/22 TN; 260/23 TN; 260/29.2 TN
[58] Field of Search ...... 260/22 TN, 23 TN, 29.2 TN

[56] References Cited

U.S. PATENT DOCUMENTS

| | | | |
|---|---|---|---|
| 3,234,039 | 2/1966 | Lalk et al. | 427/408 |
| 3,316,200 | 4/1967 | Hatala | 260/79.3 |
| 3,320,196 | 5/1967 | Rogers | 260/27 |
| 3,369,921 | 2/1968 | Stutz et al. | 427/291 |
| 3,377,198 | 4/1968 | Sander | 428/263 |
| 3,423,346 | 1/1969 | Klauss et al. | 260/22 TN |
| 3,592,580 | 7/1971 | Hoffmann | 8/6.5 |
| 3,691,117 | 9/1972 | Messerly | 260/18 |
| 3,752,778 | 8/1973 | Dhein et al. | 260/22 TN |
| 3,756,850 | 9/1973 | Story | 428/342 |
| 3,756,975 | 9/1973 | Story | 428/323 |
| 3,919,145 | 11/1975 | Eckhoff | 260/22 TN |

OTHER PUBLICATIONS

Singer, Fundamentals of Paint, Varnish and Lacquer Technology, American Paint Journal Company, St. Louis, Mo., 1957, p. 71.
Paint Industry Technical Yearbook and Materials Manual, vol. 4, 1959, Heckel Publishing Co., Philadelphia, Pa., pp. 14, 109 & 111.

*Primary Examiner*—Ronald W. Griffin
*Attorney, Agent, or Firm*—Robert H. Dewey; Howard E. Post

[57] ABSTRACT

Water base latex compositions suitable for coating corrodible metals, such as sand blasted ferrous metal, are prepared by a process characterized by the essential steps of (1) emulsifying under alkaline conditions a film forming oxidatively curable oil or alkyd modified polyurethane, and (2) blending therewith a copolymeric or homopolymeric acrylic or vinyl acetate latex.

For metal coatings or for universal coatings for both (bleeding) woods and metal, a single pigment or a combination of pigments with corrosion inhibiting characteristics can be used with the polyurethane-acrylic latex, or polyurethane vinyl latex.

30 Claims, No Drawings

COMPOSITION PROCESS FOR AQUEOUS BASE COATINGS FOR CORRODIBLE METALS

CROSS REFERENCE TO RELATED APPLICATIONS

This application is a continuation-in-part of U.S. application Ser. No. 382,040 filed July 23, 1973, now U.S. Pat. No. 3,919,145 and U.S. application Ser. No. 615,067 filed Sept. 19, 1975, now abandoned.

BACKGROUND OF THE INVENTION

In the case of corrodible metals, such as sand blasted ferrous metals, the water as well as certain ingredients often found in latex coatings (such as surfactants) corrode the metal beneath the coating to destroy the bond and discolor the surface. It is important to develop latex corrosion resistant coatings which work in order to meet our ever growing and more stringent regulations for chemicals in the environment.

SUMMARY OF THE INVENTION

To inhibit corrosion on ferrous metal surfaces requires a coating containing a resin which will not be corrosive per se and where the resin will accept highly reactive pigments. The highly reactive pigments are the most desirable from a performance standpoint (the plating of the substrate with the release of ions such as the chromate ion) but have not been used in latex coatings because the resultant paint was not viscosity stable in the container. Now for the first time we have latex coatings containing reactive pigments which are stable. The basic polyurethane and a film forming interpolymer, such as an acrylic emulsion, can be used with one or more of a selection of pigments selected from among barium metaborate, barium chromate, lead silica chromate, zinc yellow chromate, strontium chromate, zinc oxide, calcium chromate, and calcium borosilicate composite. These resin/pigment combinations not only provide corrosion control of steel but the same combinations also provide control of the tannin bleed in certain woods such as cedar and redwood.

PREFERRED EMBODIMENTS

Of the following examples, six have to do with the manufacture of the basic resin system, the seventh with a formulation for a paint, and the eighth through tenth with components and coatings particularly useful for corrosive metals.

EXAMPLE 1

The first example typifies the production of an intermediate for a high-solids oxidatively curable alkyd-modified polyurethane resin dissolved in a hydrocarbon solvent. High solids are used for ease and efficiency in manufacture and to hold the quantity of solvent within limits specified in legislation controlling solvent emissions from applied coatings.

| | |
|---|---|
| Soybean oil | 1,256 pounds |
| Litharge | 91 grams |
| Pentaerythritol, technical grade | 146 pounds |
| Phthalic anhydride | 214 pounds |
| Ethylene glycol | 56 pounds |
| Xylol | 334 pounds |
| Anti-foam solution* | ½ fl. oz. |

*A common anti-foam solution consists of a 2% solution of a silicone resin such as Dow-Corning Anti-foam A in a heavy solvent, such as Solvesso 150.

In a suitable reactor, such as an alkyd reactor, heat the soybean oil while sparging with nitrogen at 5 cubic feet per minute (5cfm). Add the pentaerythritol at 215° F. and continue the upheat, gaining 408° F. in 1 hour. At 408° F. add the litharge slurried in a small amount of oil. Continue the upheat to 453° F., taking about 1 hour. At 453° F. add the phthalic anhydride and the anti-foam solution. The elapsed time to this point is about 3 hours. Cool to 400° F. and add the ethylene glycol. After all the ethylene glycol has been added, heat to 430° and hold at 430° F. for approximately four hours, at which time the acid number will be approximately 6 to 7. Cool the batch to 300° F. and add the xylol to reduce the nonvolatile content to 84%. Pass the solution through a filter press and pump to a steam-jacketed reactor for the next stage, typified by Example 3 which illustrates the reaction of the alkyd intermediate with toluene diisocyanate.

EXAMPLE 2

This example typifies the production of an intermediate for an oxidatively curable oil-modified polyurethane.

| | |
|---|---|
| Linseed oil | 1,053 pounds |
| Litharge | 2.5 ounces |
| Glycerol | 162 pounds |
| Mineral spirits | 1,200 pounds |

Heat linseed oil to 440° F. under an inert gas blanket. Add litharge and then glycerol. Reheat to 440° F. and hold for completion of the alcoholysis reaction, as indicated by solubility of a test portion in two volumes of methyl alcohol. Cool and add mineral spirits with stirring. Pass through a filter press and pump to a steam-jacketed reactor for use in the next stage, typified by Example 4 which illustrates the reactor of this type of intermediate with toluene diisocyanate.

EXAMPLE 3

Example 3 illustrates the conversion of the alkyd-modified intermediate of Example 1 into an alkyd-modified polyurethane.

| | |
|---|---|
| Intermediate as prepared in Example 1, at 84% solids | 6,609 pounds |
| Xylol | 43.5 pounds |
| Methyl alcohol | 96.5 pounds |
| Toluene diisocyanate | 836 pounds |
| 1,10-phenanthroline (38% solution)* | 16.5 pounds |

*Commercially available as Activ-8.

Charge intermediate and xylol to a steam-jacketed reactor fitted with a reflux condenser and agitator. Use slow speed agitation (about 40 rpm). Begin heating the mixture of intermediate and xylol while adding the toluene diisocyanate over a period of a half hour. Heat to 200° F. and maintain the temperature at 200° F. Cook to an anticipated viscosity of 120 seconds in a standard 10.65 mm Gardner viscosity vial, which requires about four hours. Commence cooling at the anticipated end point and pump in 96.5 pounds of methyl alcohol below the liquid level with the condenser on. Cool to 120° F., add the phenanthroline solution and pump the mixture to storage.

The finished product has the following properties:

| Body | Z3-Z4 |
|---|---|
| Non-volatile content | 85% |
| Color (Gardner) | 5-7 |
| Acid value of non-volatile resin | 5 |
| Pounds per U.S. gallon | 8.35 |

EXAMPLE 4

Example 4 illustrates the conversion of the oil-modified intermediate of Example 2 into an oil-modified polyurethane.

| Oil-modified intermediate of Example 2 | 2,415 pounds |
|---|---|
| Toluene diisocyanate | 435 pounds |

Heat the intermediate to 110° F. in a reactor equipped with an agitator. To the stirred intermediate, add the toluene diisocyanate at the rate of 0.15 gallons per minute. After four gallons have been added, increase the flow rate to 0.4 gallons per minute. When all toluene diisocyanate has been added, hold at 110° for one hour, then allow to cool.

The final product has the following properties:

| Body | Z-Z1 |
|---|---|
| Non-volatile content | 60.3% |
| Color (Gardner) | 6-7 |
| Acid value of non-volatile resin | 0.38 |

EXAMPLE 5

This example illustrates the preparation of a 1,000-gallon batch of the alkaline emulsion of polyurethane and latex:

| Polyurethane resin at 85% solids, from Example 3 | 1,335 pounds |
|---|---|
| Ammonium hydroxide, concentrated | 40 pounds |
| Polyoxyethylated nonylphenol containing 65% ethylene oxide | 172 pounds |
| Water | 832 pounds |
| Vinyl acetate-di-2-ethylhexyl maleate copolymer latex at 55% solids or vinylacrylic latex at 55% solids | 6,561 pounds |

Heat the polyurethane resin solution to approximately 85° F. in a high-shear mixing vessel. Add the ammonia slowly, with agitation. After the ammonia is well incorporated as indicated by the homogeneity of the mixture, add the polyoxyethylated nonylphenol, then the water. Finally, add the vinyl emulsion gradually and observe the inversion from a "water-in-oil" state to the "oil-in-water" state. If the inversion is properly executed, a small particle size emulsion results, generally below 3 micron average particle size. After inversion, continue agitation for at least ten minutes. Filter and pump to storage.

The finished emulsion has the following properties:

| Viscosity | 54-60 Krebs units |
|---|---|
| Non-volatile content | 55% |
| pH | 8.5-9.5 |
| Pounds per U.S. gallon | 8.8 |

EXAMPLE 6

To accomplish a corrosion inhibiting latex coating particularly useful as a metal primer, the composition can include the blend of a polyurethane solvent resin (any one of examples 1-4 above) emulsified (per example 5) and a film forming interpolymer such as an acrylic emulsion (also example 5). This combination has corrosion resistance per se but preferably is combined with corrosion inhibiting pigments such as barium metaborate, barium chromate, lead silica chromate, zinc yellow chromate, strontium chromate, zinc oxide, calcium chromate, calcium borosilicate composite, used singly or in combination. A mixture of 70 parts strontium chromate and 30 parts iron oxide forms an improved pigment additive having blister resistance and stability, with the iron oxide further reducing both the water solubility of the strontium chromate as well as the overall cost of the formula.

EXAMPLE 7

A universal primer for metal and wood must resist corrosion and tannin bleed. A composition for this purpose can include any of the pigments listed in Example 6 but since most wood primers are white the preferred pigments or combination thereof are:
Barium metaborate
Calcium borosilicate composite

EXAMPLE 8

A resin where the interpolymer is a 100% acrylic latex can be prepared as follows:

| Preparation of Acrylic Polyurethane Emulsion 585 gallon batch: | |
|---|---|
| Polyurethane resin at 85% solids, from Example 3 | 450 pounds |
| Ammonium hydroxide concentrated | 9 pounds |
| Polyoxyethylated nonylphenol containing 65% ethylene oxide | 60 pounds |
| 100% acrylic thermoplastic emulsion at 46% solids | 4,737 pounds |
| | 5,256 pounds total |

Heat the polyurethane resin solution to approximately 85° F. in a high-shear mixing vessel. Add the ammonia slowly with agitation. After the ammonia is well incorporated, as indicated by the homogeneity of the mixture, add the nonylphenol. Finally add the acrylic emulsion gradually. After inversion, continue agitation for at least ten minutes, filter and pump to storage. The finished emulsion has the following properties:

| Wt. per gal. | 9 pounds |
|---|---|
| Visc. | 50-55 KU |
| pH | 9-9.5 |
| Non vol. | 49% plus or minus 1% |

When this acrylic polyurethane emulsion is used in conjunction with corrosion-inhibiting pigments in a properly formulated paint, a highly water-resistant and rust-resistant film results.

EXAMPLE 9

The properties of water-resistance and corrosion-inhibition may be further enhanced by the addition of approximately 1.5% (by weight of the total resin) of a silicone polymer (1.5% × 5,256 lbs. = 79 lbs). The silicone polymer is added directly to the polyurethane resin as illustrated below:

| Preparation of Silicone Acrylic Polyurethane Emulsion 614 gallon batch: | |
|---|---|
| Polyurethane resin at 85% solids | 450 pounds |
| 33% silicone resin dissolved in mineral spirits | 79 pounds |
| Ammonium hydroxide concentrated | 9 pounds |
| Polyoxyethylated nonylphenol containing 65% ethylene oxide | 60 pounds |
| 100% acrylic thermoplastic emulsion at 46% solids (exterior latex paint grade) | 4,737 pounds |
| at 49% N.V. | 5,335 pounds total |

Manufacturing procedure same as Example 6. The physical properties same. As measured in a salt fog laboratory testing apparatus, the silicone acrylic polyurethane emulsion has more corrosion inhibition than the acrylic polyurethane emulsion without silicone.

EXAMPLE 10

An illustration of a corrosion-inhibiting paint utilizing the silicone acrylic polyurethane emulsion is as follows:

| Preparation of a Corrosion-Inhibiting Latex Paint 106 gallon batch: | |
|---|---|
| Water | 108 pounds |
| Hydroxyethylcellulose thickener 4400 cps | 2 pounds |
| Pigment dispersant, sodium salt of polymeric carboxylic acid | 9.9 |
| Polyoxyethylated nonylphenol containing 65% ethylene oxide | 2.2 pounds |
| Ethylene glycol | 23.3 pounds |
| Ester alcohol consisting of 2,2,4-trimethylpentane-diol-1,3,monoisobutyrate | 15.8 |
| Titanium dioxide | 50 pounds |
| Mica 325 mesh | 12.5 pounds |
| Strontium Chromate Pigment | 70 pounds |
| Iron oxide | 30 pounds |
| 1-(3-chloroallyl)-3,5,7-triaza-1-azonia adamantine chloride | 1 pound |
| Anhydrous sodium potassium aluminum silicate extender pigment | 125 pounds |
| Let Down Phase | |
| Alkaline silicone acrylic polyurethane emulsion of Example 9 at 49% solids | 666 pounds |
| Aluminum hydroxide concentrated | 2 pounds |
| Water | 8.3 pounds |
| | 1,126 pounds total |
| Physical Properties | |
| P.V.C. | 25% |
| Wt./gal. | 10.66 pounds |
| Viscosity | 72 KU |
| pH | 8.5 |
| Non vol. | 55% |

Manufacturing Instructions

Use a disc type high speed disperser.

Add ingredients in the order shown with the disperser on at slow speed.

Increase agitator speed for dispersion phase and hold for ten minutes before the additions of the let down phase.

Decrease agitator speed for the let down. Filter and pump to storage.

What I claim is:

1. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin, wherein said polyurethane resin is the reaction product of a diisocyanate with an hydroxylic oil-modified resin intermediate, wherein said intermediate is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids.

2. The composition of claim 1 wherein the polyurethane resin comprises 10–20% of the total resinous binder.

3. The composition of claim 2 wherein the polyurethane resin is a reaction product of toluene diisocyanate with the alcoholysis product of a drying oil and a polyhydric alcohol.

4. The composition of claim 3 in which the drying oil is selected from the group consisting of linseed, safflower, walnut and soybean oil.

5. The composition of claim 2 wherein the polyurethane resin is a reaction product of toluene diisocyanate and a hydroxal group containing alkyd resin containing an oxidatively drying oil selected from the group consisting of linseed, safflower, walnut and soybean oils.

6. The composition of claim 1 wherein the film-forming polymer is an acrylic homopolymer.

7. The composition of claim 1 wherein the film-forming polymer is a vinyl acetate polymer.

8. The composition of claim 7 wherein the film forming polymer is the copolymer of vinyl acetate with one or more copolymerizable monomers chosen from the group consisting of butyl acrylate, isobutyl acrylate, 2-ethyl hexyl acrylate, dibutyl maleate, di-isobutyl fumarate, di-2-ethylhexyl fumarate, ester of versatic acid and ethylene.

9. A composition of claim 1, in which the pH of the latex composition is maintained between 9.5 and 10.5.

10. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin, wherein said polyurethane resin is the reaction product of a diisocyanate with an hydroxylic oil-modified resin intermediate, wherein said intermediate is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids, and (3) a corrosion inhibiting pigment.

11. The composition of claim 10 in which the pigment is selected from among barium metaborate, barium chromate, lead silica chromate, zinc yellow chromate, strontium chromate, zinc oxide, calcium chromate, and calcium borosilicate composite.

12. The composition of claim 10, in which the pigment is a combination of barium metaborate and calcium borosilicate composite.

13. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin dissolved in a maximum of 25% of its weight of hydrocarbon solvent, wherein said polyurethane resin is the reaction product of a diisocyanate with an hydroxylic oil-modified resin intermediate, wherein said intermediate is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids.

14. The composition of claim 13 wherein the hydrocarbon solvent is selected from the group consisting of xylene and mineral spirits.

15. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin, wherein said polyurethane resin is the reaction product of a diisocyanate with an hydroxylic oil-modified resin intermediate, wherein said intermediate is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids, and (3) a silicone polymer in an amount of about 1.5% by weight of the total resin binder.

16. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin, wherein said polyurethane resin is the reaction product of a diisocyanate with an hydroxylic oil-modified resin intermediate, wherein said intermediate is reacted with one or more dibasic acids selected from the group consisting of phthalic anhydride, isophthalic acid, maleic acid, adipic acid and succinic acid and wherein said hydroxylic oil-modified resin is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids or (c) the reaction product of the hydroxylic oil-modified resin.

17. The composition of claim 16 wherein the polyurethane resin comprises 10–20% of the total resinous binder.

18. The composition of claim 17 wherein the polyurethane resin is a reaction product of toluene diisocyanate with the alcoholysis product of a drying oil and a polyhydric alcohol.

19. The composition of claim 18 in which the drying oil is selected from the group consisting of linseed, safflower, walnut and soybean oil.

20. The composition of claim 17 wherein the polyurethane resin is a reaction product of toluene diisocyanate and a hydroxyl group containing alkyd resin containing an oxidatively drying oil selected from the group consisting of linseed, safflower, walnut and soybean oils.

21. The composition of claim 16 wherein the film-forming polymer is an acrylic homopolymer.

22. The composition of claim 16 wherein the film-forming polymer is a vinyl acetate polymer.

23. The composition of claim 22 wherein the film forming interpolymer is the copolymer of vinyl acetate with one or more copolymerizable monomers chosen from the group consisting of butyl acrylate, isobutyl acrylate, 2-ethylhexyl acrylate, dibutyl maleate, diisobutyl fumarate, di-2-ethylhexyl fumarate, ester of versatic acid and ethylene.

24. A composition of claim 16 in which the pH of the latex composition is maintained between 9.5 and 10.5.

25. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin, wherein said polyurethane resin is the reaction product of a diisocyanate with an hydroxylic oil-modified resin intermediate, wherein said intermediate is reacted with one or more dibasic acids selected from the group consisting of phthalic anhydride, isophthalic acid, maleic acid, adipic acid and succinic acid and wherein said hydroxylic oil-modified resin is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids or (c) the reaction product of the hydroxylic oil-modified resin, and (3) a corrosion inhibiting pigment.

26. The composition of claim 25 in which the pigment is selected from among barium metaborate, barium chromate, lead silica chromate, zinc yellow chromate, strontium chromate, zinc oxide, calcium chromate, and calcium borosilicate composite.

27. The composition of claim 25 in which the pigment is a combination of barium metaborate and calcium borosilicate composite.

28. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin which comprises 10–20% of the total resinous binder, wherein said polyurethane resin is the reaction product of a diisocyanate with an hydroxylic oil-modified resin intermediate, wherein said intermediate is reacted with one or more dibasic acids selected from the group consisting of phthalic anhydride, isophthalic acid, maleic acid, adipic acid and succinic acid and wherein said hydroxylic oil-modified resin is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids or (c) the reaction product of the hydroxylic oil-modified resin, and (3) a silicone polymer in an amount of about 1.5% by weight of the total resin binder.

29. A water base latex composition for coating corrodible surfaces consisting essentially of (1) an aqueous resin binder formed by blending an aqueous dispersion of a film-forming polymer selected from the group consisting of acrylic and vinyl acetate polymers and (2) an aqueous alkaline emulsion of a polyurethane resin dissolved in a maximum of 25% of its weight of hydrocarbon solvent, wherein said polyurethane resin is the reaction product of a diisocyanate with an hydroxylic oil-modified resin intermediate, wherein said intermediate is reacted with one or more dibasic acids selected from the group consisting of phthalic anhydride, isophthalic acid, maleic acid, adipic acid and succinic acid and wherein said hydroxylic oil-modified resin is (a) the alcoholysis product of a synthetic or natural drying oil or semi-drying oil and one or more polyhydric alcohols or (b) the reaction product of one or more polyhydric alcohols and one or more acids selected from the group consisting of monomeric and polymeric drying and semi-drying fatty acids or (c) the reaction product of the hydroxylic oil-modified resin.

30. The composition of claim 29 wherein the hydrocarbon solvent is selected from the group consisting of xylene and mineral spirits.

* * * * *